US012587494B2

(12) United States Patent
Fox et al.

(10) Patent No.: US 12,587,494 B2
(45) Date of Patent: Mar. 24, 2026

(54) COORDINATED EMOTION REPRESENTATION AND EXPRESSION IN MULTI-AGENT DIGITAL ASSISTANTS

(71) Applicant: International Business Machines Corporation, Armonk, NY (US)

(72) Inventors: Jeremy R. Fox, Georgetown, TX (US); Jessica Nahulan, Markham (CA); Martin G. Keen, Cary, NC (US); Fernando Luiz Koch, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 18/415,716

(22) Filed: Jan. 18, 2024

(65) Prior Publication Data

US 2025/0240256 A1 Jul. 24, 2025

(51) Int. Cl.
*H04L 51/02* (2022.01)
*G06F 40/35* (2020.01)
*H04L 67/306* (2022.01)

(52) U.S. Cl.
CPC .............. *H04L 51/02* (2013.01); *G06F 40/35* (2020.01); *H04L 67/306* (2013.01)

(58) Field of Classification Search
CPC ........ H04L 51/02; H04L 67/306; G06F 40/35
See application file for complete search history.

(56) References Cited

U.S. PATENT DOCUMENTS

| | | | |
|---|---|---|---|
| 9,641,563 B1 | 5/2017 | Kitada et al. | |
| 11,075,862 B2 | 7/2021 | Tenyenhuis et al. | |
| 11,200,506 B2 | 12/2021 | Wu | |
| 11,303,589 B2 | 4/2022 | Lalji | |
| 2020/0234181 A1 | 7/2020 | Katz et al. | |
| 2021/0056968 A1* | 2/2021 | Shreeshreemal | ....... G06F 3/167 |
| 2022/0148573 A1 | 5/2022 | Aher et al. | |

(Continued)

FOREIGN PATENT DOCUMENTS

KR 102166008 B1 10/2020

OTHER PUBLICATIONS

Chen et al., "Artificial Empathy: a New Perspective for Analyzing and Designing Multi-Agent Systems", IEEE Access, vol. 8, 2020, 16 Pages.

(Continued)

*Primary Examiner* — Soe Hlaing
(74) *Attorney, Agent, or Firm* — Joseph P. Curcuru

(57) ABSTRACT

In an approach to coordinated emotion representation and expression in multi-agent digital assistants, one or more computer processors monitor a conversation of a first user. One or more computer processors determine an intervention opportunity is present in the conversation. One or more computer processors retrieve a profile associated with the first user. One or more computer processors determine a context of the conversation. Based on the profile associated with the first user and the context of the conversation, one or more computer processors generate one or more emotion-based responses. One or more computer processors determine a most appropriate response of the one or more emotion-based responses. One or more computer processors present the most appropriate response to the first user.

20 Claims, 3 Drawing Sheets

(56)               References Cited

U.S. PATENT DOCUMENTS

2023/0007063 A1      1/2023  Gupta et al.
2023/0039235 A1*    2/2023  Biswas ................... G10L 15/22

OTHER PUBLICATIONS

Costantini et al., "Multi-agent System Engineering for Emphatic Human-Robot Interaction", 2019 IEEE Second International Conference on Artificial Intelligence and Knowledge Engineering (AIKE), Sardinia, Italy, 2019, 7 Pages.
Disclosed Anonymously, "Determining High-Level Topical Annotations for a Conversation", An IP.com Prior Art Database Technical Disclosure, IP.com No. IPCOM000252291D, IP.com Electronic Publication Date: Jan. 3, 2018, 34 Pages.
Disclosed Anonymously, "Using Customer Support Interaction to Estimate Customer Satisfaction", An IP.com Prior Art Database Technical Disclosure, IP.com No. IPCOM000252343D, IP.com Electronic Publication Date: Jan. 5, 2018 , 34 Pages.

\* cited by examiner

300

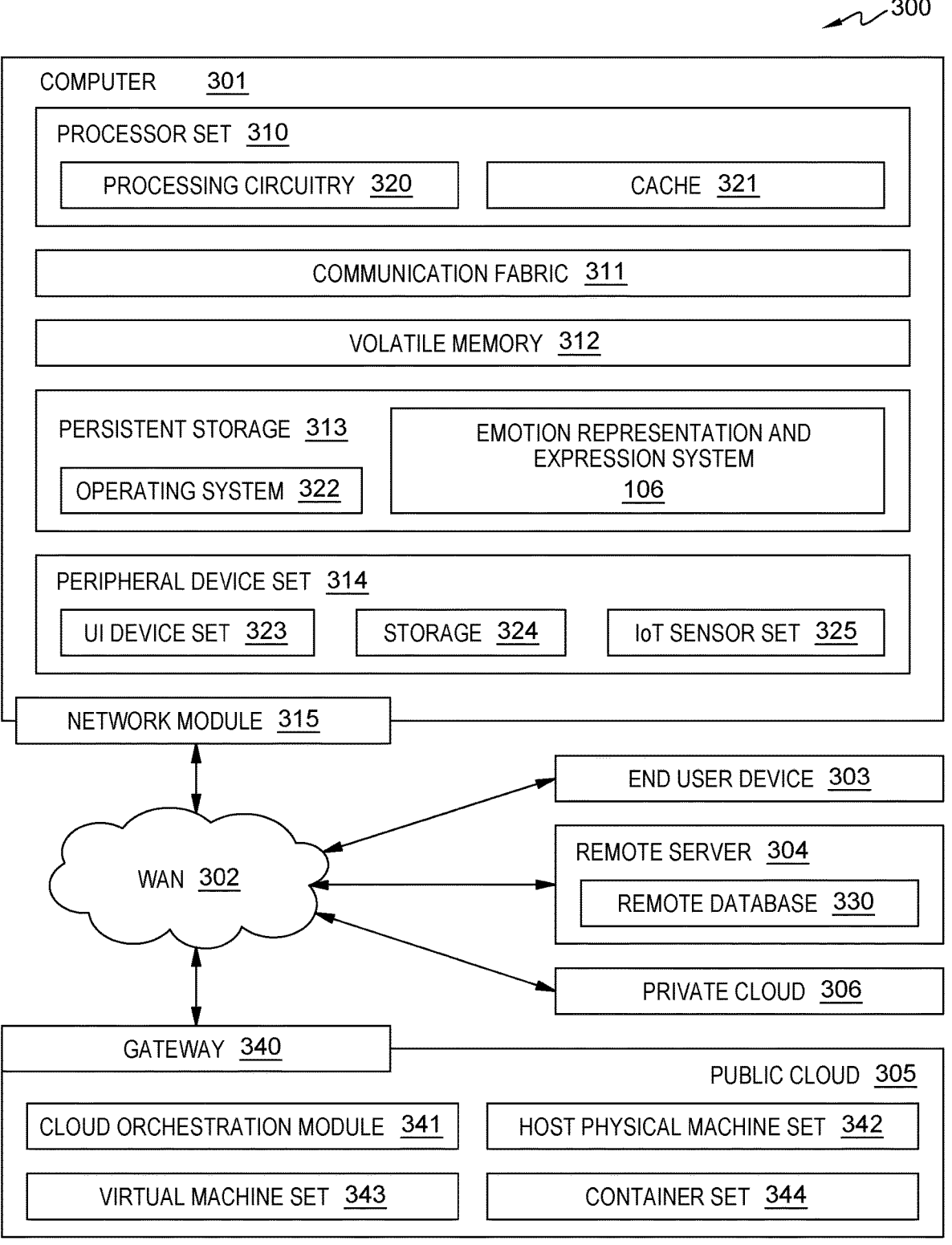

COMPUTER    301

PROCESSOR SET  310

PROCESSING CIRCUITRY  320        CACHE  321

COMMUNICATION FABRIC  311

VOLATILE MEMORY  312

PERSISTENT STORAGE  313

OPERATING SYSTEM  322

EMOTION REPRESENTATION AND
EXPRESSION SYSTEM
106

PERIPHERAL DEVICE SET  314

UI DEVICE SET  323        STORAGE  324        IoT SENSOR SET  325

NETWORK MODULE  315

WAN  302

END USER DEVICE  303

REMOTE SERVER  304

REMOTE DATABASE  330

PRIVATE CLOUD  306

GATEWAY  340

PUBLIC CLOUD  305

CLOUD ORCHESTRATION MODULE  341        HOST PHYSICAL MACHINE SET  342

VIRTUAL MACHINE SET  343        CONTAINER SET  344

FIG. 3

COORDINATED EMOTION REPRESENTATION AND EXPRESSION IN MULTI-AGENT DIGITAL ASSISTANTS

BACKGROUND OF THE INVENTION

The present invention relates generally to the field of digital assistants, and more particularly to coordinated emotion representation and expression in multi-agent digital assistants.

Digital assistants, also referred to as virtual assistants, conversational agents, chatbots, etc., are gaining a wide popularity and interact with people in natural languages, thereby providing customer services and companionship. A digital assistant is a software application that may be used to conduct an on-line chat communication via text or text-to-speech, in lieu of providing direct contact with a human agent. Digital assistants typically receive and process commands or requests via one or more natural language processing techniques. Designed to convincingly simulate the way a human behaves as a conversational partner, digital assistant systems typically require continuous tuning and testing. Digital assistants are used in dialog systems for various purposes including customer service, request routing, or for information gathering. While some digital assistants use extensive word-classification processes, natural language processors, and sophisticated artificial intelligence (AI), others simply scan for general keywords and generate responses using common phrases obtained from an associated library or database.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, that is, enabling computers to derive meaning from human or natural language input.

Sentiment analysis refers to the use of NLP, text analysis, computational linguistics, and biometrics to systematically identify, extract, quantify, and study affective states and subjective information. Sentiment analysis is widely applied to voice of customer materials such as reviews and survey responses, online and social media, and healthcare materials for applications that range from marketing to customer service to clinical medicine.

SUMMARY

Embodiments of the present invention disclose a computer-implemented method, a computer program product, and a system for coordinated emotion representation and expression in multi-agent digital assistants. The computer-implemented method may include one or more computer processors monitoring a conversation of a first user. One or more computer processors determine an intervention opportunity is present in the conversation. One or more computer processors retrieve a profile associated with the first user. One or more computer processors determine a context of the conversation. Based on the profile associated with the first user and the context of the conversation, one or more computer processors generate one or more emotion-based responses. One or more computer processors determine a most appropriate response of the one or more emotion-based responses. One or more computer processors present the most appropriate response to the first user.

BRIEF DESCRIPTION OF THE DRAWINGS

FIG. 3 illustrates an exemplary computer environment in which aspects of one or more of the illustrative embodiments may be implemented, and at least some of the computer code involved in performing the inventive methods may be executed, in accordance with an embodiment of the present invention.

DETAILED DESCRIPTION

Figure 1:
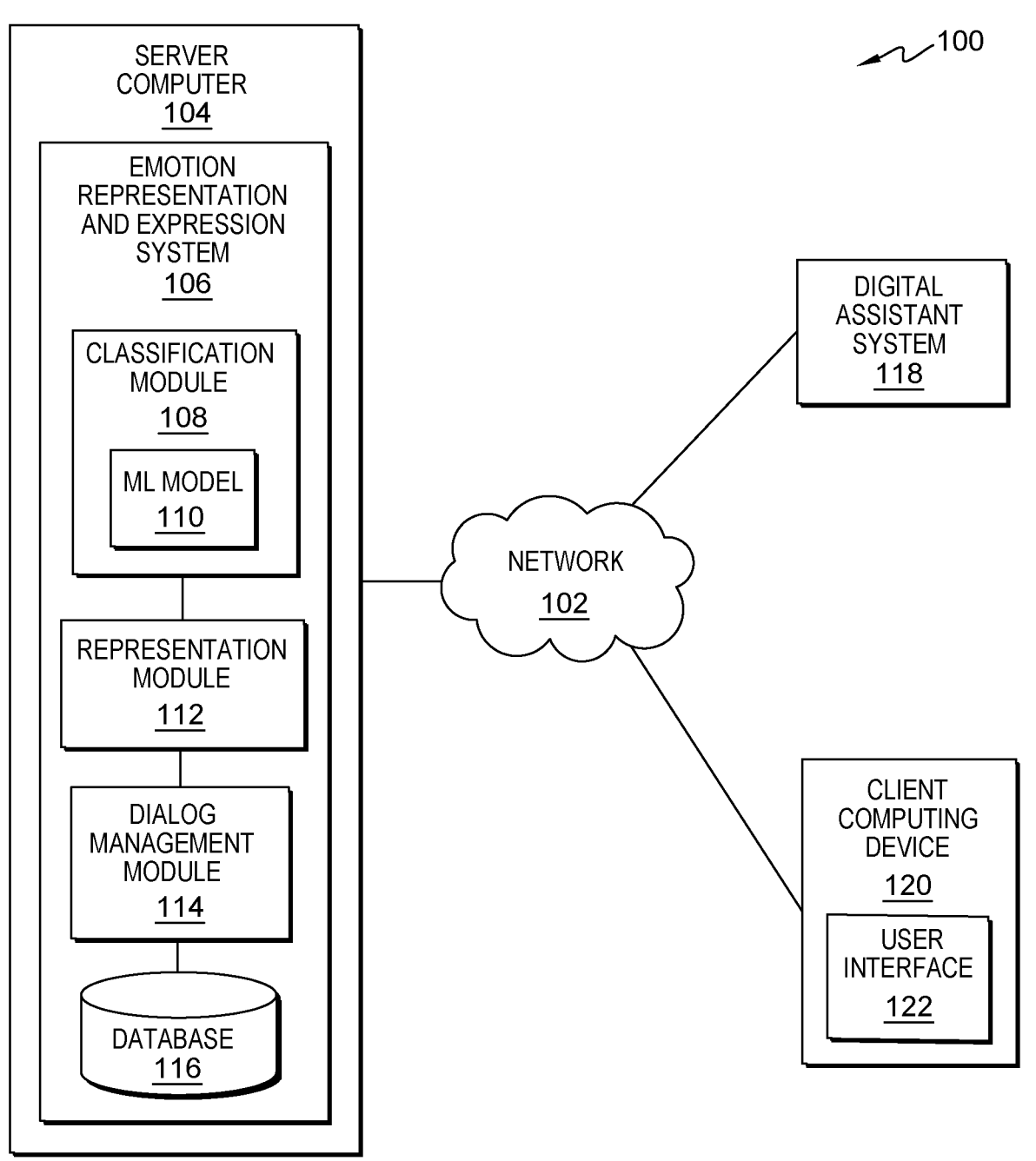
FIG. 1 is a functional block diagram illustrating a distributed data processing environment, in accordance with an embodiment of the present invention.

Emotions play a crucial role in human communication, as they help convey our feelings and intentions to others. However, communicating with machines has historically been devoid of emotional expression, leading to a lack of empathy and understanding between humans and machines. To address this challenge, researchers have developed methods to understand and represent emotions in a structured format, enabling more effective and empathetic communication between humans and machines. One approach to emotion understanding and representation is to classify emotions into distinct categories, such as happiness, sadness, anger, and fear. This can be achieved through machine learning algorithms, such as support vector machines (SVM) or random forests, which can learn patterns and relationships between emotions based on labeled datasets. Once the emotions are classified, they can be represented in a structured format, such as a vector or matrix, allowing for easy comparison and grouping of emotions. By representing emotions in a structured format, machines can better understand human emotions and respond accordingly. For example, a digital assistant can use emotion representation to personalize its response to a user's query or request, leading to a more empathetic and effective communication between humans and machines. Emotion understanding (comprehension) and representation can enable machines to detect and respond to emotional cues in human language, such as detecting sadness or anger in a user's voice or text-based input. This can lead to more appropriate and personalized responses from the machine, improving the overall communication experience between humans and machines.

Digital assistants have revolutionized the way we interact with technology, but they are still limited in their ability to understand and respond to human emotions. This can lead to frustrating experiences for users who feel misunderstood or overlooked by the machines. Moreover, current emotion representation methods are often limited to simple classification schemes, such as happy, sad, or angry, which do not capture the complexity and nuance of human emotions. Embodiments of the present invention recognize that improvements to digital assistants may be made by providing a method for coordinated emotion representation and expression in multi-agent digital assistants that infuses multiple technologies to enable effective and empathetic communication between humans and the digital assistants. Embodiments of the present invention also recognize that by classifying and representing emotion patterns from individual human-agent interactions, understanding user profiles in contextualized conversation, grouping emotion patterns in multi-user interactions, and devising emotion representation in multi-user dialog considering profiles, context, and goal-driven emotional sensitivity support, the user experience with the digital assistant is more personalized and human-like. Embodiments of the present invention further recognize that efficiency and effectiveness of a digital assistant may be gained by providing an empathetic and understanding user interface, whereby the system reduces the likelihood of user frustration, anger, or even confusion, which can lead to negative impacts on both individuals and organizations. Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, digital assistant system 118, and client computing device 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, digital assistant system 118, client computing device 120, and other computing devices (not shown) within distributed data processing environment 100. Distributed data processing environment 100 may be implemented in computing environment 300 shown in FIG. 3.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with digital assistant system 118, client computing device 120, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes emotion representation and expression system 106 and database 116. Server computer 104 may include internal and external hardware components, as depicted and described in further detail with respect to computer 301 of FIG. 3.

Emotion representation and expression system 106 is responsible for expressing emotions in a coordinated manner using a combination of NLP techniques and user profiling for a digital assistant. Emotion representation and expression system 106 expresses emotions in a way that is consistent with the personality of the user and the context of the conversation. Emotion representation and expression system 106 coordinates emotion expression considering user profile patterns, representation of a current emotional situation, and desired influence in emotion outcomes. Emotion representation and expression system 106 classifies and represents emotion patterns and labels from individual human-agent interactions. Emotion representation and expression system 106 classifies and understands a user profile and preferences in contextualized conversation. Emotion representation and expression system 106 classifies and groups emotion patterns in multi-user interactions and devises emotion representation in multi-user dialog considering the profiles, the context, and goal-driven emotional sensitivity support. By using the aforementioned data, emotion representation and expression system 106 outputs a coordinated emotion representation and expression in multi-agent digital assistants that includes accurate classification of emotions based on individual human-agent interactions, as well as a grouping of emotion patterns in multi-user interactions based on the features and properties, resulting in a personalized and human-like experience for the user.

Emotion representation and expression system 106 monitors a user conversation, and if emotion representation and expression system 106 determines an intervention opportunity is present, then emotion representation and expression system 106 retrieves a user profile. Emotion representation and expression system 106 determines the context of the conversation. Emotion representation and expression system 106 generates emotion-based dialog responses and determines the most appropriate response. Emotion representation and expression system 106 presents the response to the user. Emotion representation and expression system 106 receives feedback associated with the response from the user and stores the feedback. In the depicted embodiment, emotion representation and expression system 106 is a standalone system. In another embodiment, emotion representation and expression system 106 is integrated into digital assistant system 118. Emotion representation and expression system 106 includes classification module 108, representation module 112, and dialog management module 114. Emotion representation and expression system 106 is depicted and described in further detail with respect to FIG. 2.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the user to opt-in or opt-out of participation. Similarly, in various embodiments, emails and texts begin with a written notification that the user's information may be recorded or monitored and may be saved, for the purpose of coordinated emotion representation and expression in multi-agent digital assistants. These embodiments may also include periodic reminders of such recording and monitoring throughout the course of any such use. Certain embodiments may also include regular (e.g., daily, weekly, monthly) reminders to the participating parties that they have consented to being recorded and monitored for coordinated emotion representation and expression in multi-agent digital assistants and may provide the participating parties with the opportunity to opt-out of such recording and monitoring if desired. Furthermore, to the extent that any non-participating parties' actions are monitored (for example, when outside vehicles are viewed), such monitoring takes place for the limited purpose of providing navigation assistance to a participating party, with protections in place to prevent the unauthorized use or disclosure of any data for which an individual might have a certain expectation of privacy.

Classification module 108 classifies emotion patterns from individual human-agent interactions to learn the patterns and relationships between emotions, resulting in a model that can accurately classify emotions in new input data. Classification module 108 performs emotion data collection by aggregating a large dataset of human-agent interactions, including text, audio, and video recordings, where the emotions of the user are explicitly expressed or inferred. In an embodiment, classification module 108 aggregates the human-agent interaction data from one or more software applications included on client computing device 120, via user interface 122. For example, classification module 108 may retrieve data from applications such as email, text, social media, etc. In an embodiment, classification module 108 stores the aggregated data in database 116. Classification module 108 extracts relevant features from the aggregated data, such as sentiment, tone, theme, and intensity, using one or more NLP techniques and/or emotion detection algorithms. In an embodiment, classification module 108 uses NLP application programming interfaces (APIs) for text processing and sentiment analysis which can provide a nuanced understanding of the emotions of the user beyond basic sentiment analysis. In another embodiment, classification module 108 uses other emotion detection APIs which can analyze audio and/or video recordings to detect emotions in real-time.

Classification module 108 identifies patterns in the extracted features such as frequency, duration, and co-occurrence, to create a unique emotional fingerprint for each user. Classification module 108 includes machine learning (ML) model 110 and trains ML model 110 using a subset of the dataset for training, while reserving a different subset of the dataset for validation. Classification module 108 evaluates the performance of ML model 110 by measuring accuracy, precision, recall, and F1-score, and adjusts ML model 110 as needed to improve performance. In an embodiment, classification module 108 sets external configuration variables, i.e., hyperparameters, such as learning rate, regularization strength, and number of hidden layers, before training ML model 110, and then fine-tunes the hyperparameters to improve the performance of ML model 110. The fine-tuning consists of adjusting the hyperparameters to optimize ML model 110 for a specific task, i.e., classification of emotion data. In an embodiment, classification module 108 directly informs dialog management module 114 for potential emotion-based dialog choices. In an embodiment, classification module 108 provides direct feedback to emotion representation and expression system 106 for immediate response scenarios.

In an embodiment, ML model 110 may be, for example, a support vector machines (SVM) algorithm with a radial basis function kernel, which is effective in high-dimensional spaces and can capture non-linear relationships between emotions. In another embodiment, ML model 110 may be a random forest algorithm with a random feature selection method which can improve interpretability and reduce over fitting.

Representation module 112 represents the emotion patterns classified by classification module 108 in a structured format, enabling simplified comparison and grouping of emotions. Representation module 112 collects the emotion patterns classified by classification module 108, and outputs the patterns in the form of a vector or matrix. If necessary, representation module 112 preprocesses the collected data by normalizing, filtering, and/or transforming the data to ensure consistency and quality. Representation module 112 extracts relevant features from the preprocessed data, such as the amplitude and frequency of emotions, using one or more techniques known in the art, to capture the most important features of the data. For example, representation module 112 may use a principal component analysis (PCA) and/or a singular value decomposition (SVD) technique for feature extraction. Representation module 112 selects a subset of the most informative features, based on the features' relevance to the goals of digital assistant system 118, as well as user preferences, to create a compact and meaningful representation of emotions. In an embodiment, representation module 112 applies one or more dimensionality reduction techniques to select features in order to reduce the complexity and visualize the emotions in a lower-dimensional space, which can provide a more interpretable and visually appealing representation of the emotions. For example, representation module 112 may use a PCA technique and/or a t-distributed stochastic neighbor embedding (t-SNE) technique for dimensionality reduction. Representation module 112 visualizes the emotions in a structured format, such as a heatmap or scatter plot, to provide an intuitive representation of the emotions of the user and facilitate simplified comparison and grouping.

Dialog management module 114 devises emotion representation in single user and/or multi-user dialog considering user profiles, conversation context, and goal-driven outcomes. Dialog management module 114 collects, i.e., fetches the emotion patterns represented by representation module 112 in the form of vectors or matrices for further understanding and processing. Based on the collected emotion patterns, dialog management module 114 generates a user profile to capture the user's emotional characteristics and preferences. In an embodiment, the user profile may include additional details about the user, for example, age, education level, occupation, family history, or any other characteristic that can influence the user's emotions. In an embodiment, dialog management module 114 uses clustering to group similar emotions and generate a user profile. For example, dialog management module 114 may use clustering algorithms, such as k-means or hierarchical clustering. In an embodiment, dialog management module 114 uses dimensionality reduction to reduce the complexity of the emotions and generate a more interpretable representation. For example, dialog management module 114 may use dimensionality reduction algorithms, such as PCA or t-SNE. In an embodiment, dialog management module 114 stores the generated user profile in database 116. In an embodiment, dialog management module 114 also determines the context of the conversation and generates emotion-based dialog choices, as will be discussed in more detail with respect to FIG. 2. In addition, dialog management module 114 manages the flow of the conversation and integrates a feedback loop, as will be discussed in more detail with respect to FIG. 2.

In the depicted embodiment, database 116 resides on server computer 104. In another embodiment, database 116 may reside elsewhere within distributed data processing environment 100, provided that emotion representation and expression system 106 has access to database 116, via network 102. A database is an organized collection of data. Database 116 can be implemented with any type of storage device capable of storing data and configuration files that can be accessed and utilized by emotion representation and expression system 106 such as a database server, a hard disk drive, or a flash memory. Database 116 stores information used by and generated by emotion representation and expression system 106. For example, database 116 stores user profiles generated by dialog management module 114. Database 116 also stores user feedback received by emotion representation and expression system 106 to be used as training data for process improvement. Further, database 116 stores the dataset of human-agent interactions, including text, audio, and video recordings, for use in classification by classification module 108 and/or ML model 110. In addition, database 116 stores extracted relevant features from the dataset. Database 116 may also store the representations of emotion patterns generated by representation module 112 as vectors and/or matrices.

The present invention may contain various accessible data sources, such as database 116, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Emotion representation and expression system 106 enables the authorized and secure processing of personal data. Emotion representation and expression system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Emotion representation and expression system 106 provides information regarding personal data and the nature (e.g., type, scope, purpose, duration, etc.) of the processing. Emotion representation and expression system 106 provides the user with copies of stored personal data. Emotion representation and expression system 106 allows the correction or completion of incorrect or incomplete personal data. Emotion representation and expression system 106 allows the immediate deletion of personal data.

Digital assistant system 118 is one or more of a plurality of software applications known in the art that interact with users using natural language processing (NLP) techniques to provide assistance with a request for such things as instructions, information, task performance, etc., and/or to conduct an on-line chat communication via text or text-to-speech to help a user resolve an issue.

Client computing device 120 can be one or more of a laptop computer, a tablet computer, a smart phone, smart watch, a smart speaker, or any programmable electronic device capable of communicating with various components and devices within distributed data processing environment 100, via network 102. Client computing device 120 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, client computing device 120 may be integrated into a vehicle. For example, client computing device 120 may be a heads-up display in the windshield of the vehicle. In an embodiment where client computing device 120 is integrated into the vehicle, client computing device 120 includes a programmable, embedded Subscriber Identity Module (eSIM) card (not shown) that includes a unique identifier of the vehicle in addition to other vehicle information. In general, client computing device 120 represents one or more programmable electronic devices or combination of programmable electronic devices capable of executing machine readable program instructions and communicating with other computing devices (not shown) within distributed data processing environment 100 via a network, such as network 102. Client computing device 120 includes an instance of user interface 122.

User interface 122 provides an interface between a user of client computing device 120 and digital assistant system 118. In one embodiment, user interface 122 is mobile application software. Mobile application software, or an "app," is a computer program designed to run on smart phones, tablet computers and other mobile devices. In one embodiment, user interface 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 122 enables a user of client computing device 120 to interact with digital assistant system 118, i.e., make requests and receive responses.

Figure 2:
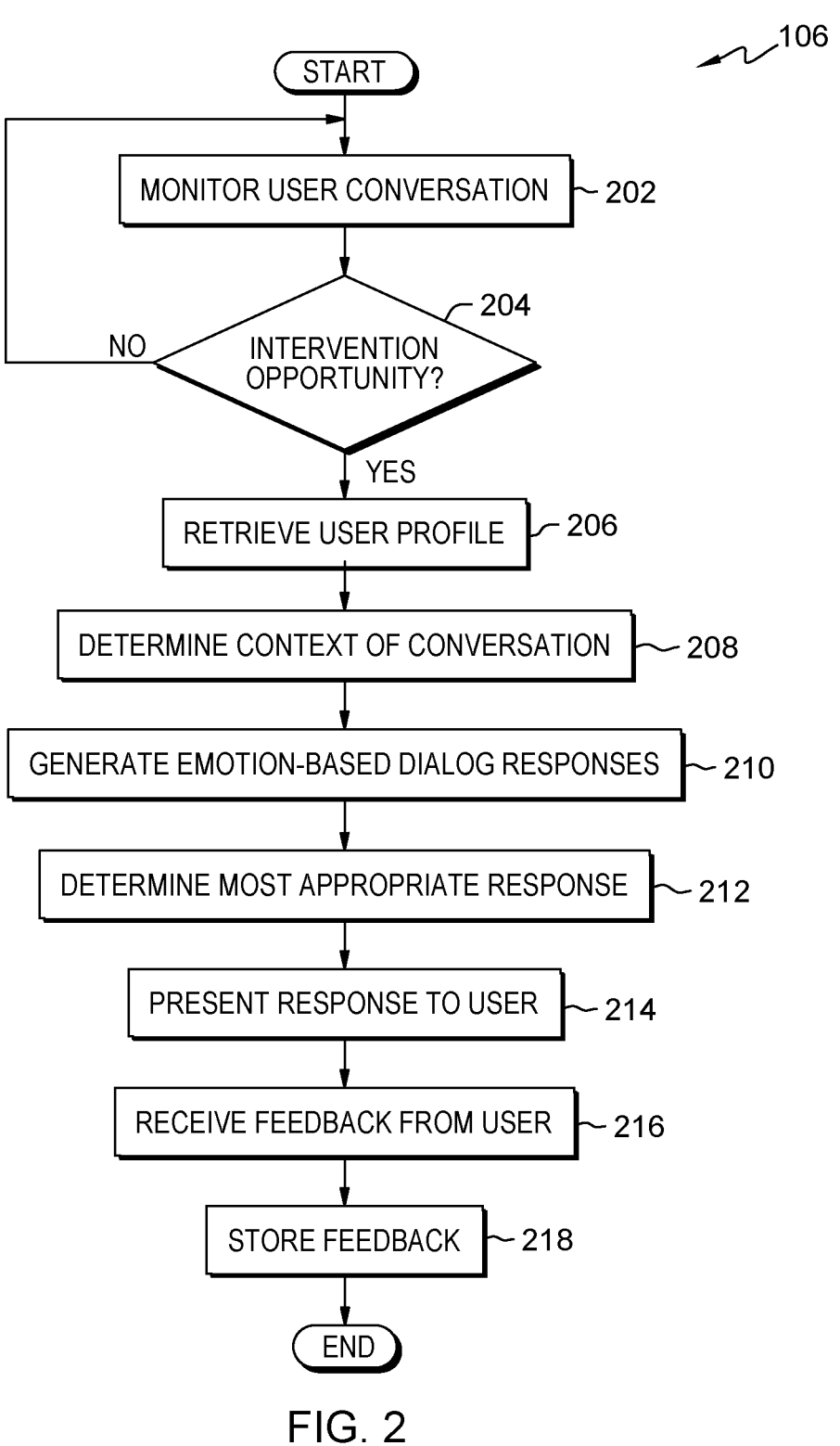
FIG. 2 is a flowchart depicting operational steps of an emotion representation and expression system, on a server computer within the distributed data processing environment of FIG. 1, for coordinated emotion representation and expression in multi-agent digital assistants, in accordance with an embodiment of the present invention.

FIG. 2 is a flowchart depicting operational steps of emotion representation and expression system 106, on server computer 104 within distributed data processing environment 100 of FIG. 1, for coordinated emotion representation and expression in multi-agent digital assistants, in accordance with an embodiment of the present invention.

Emotion representation and expression system 106 monitors a user conversation (step 202). In an embodiment, emotion representation and expression system 106 monitors a conversation between a single user and digital assistant system 118 to detect emotional characteristics, such as sentiment, tone, etc. being expressed by the user. In another embodiment, emotion representation and expression system 106 monitors a conversation between two or more users to detect emotional characteristics, such as sentiment, tone, etc.

being expressed by the two or more users. For example, emotion representation and expression system 106 may use one or more sentiment analysis techniques for monitoring the conversation.

Emotion representation and expression system 106 determines whether an intervention opportunity is present (decision block 204). In the embodiment where the conversation is between a single user and digital assistant system 118, based on the detected emotional characteristics of the single user, emotion representation and expression system 106 determines whether there is an opportunity to intervene in the conversation to improve the response of digital assistant system 118. In the embodiment where the conversation is between two or more users, based on the detected emotional characteristics of the two or more users, emotion representation and expression system 106 determines whether there is an opportunity to intervene in the conversation to recommend a response, via digital assistant system 118, to at least one of the two or more users that may improve the communication between the users.

If emotion representation and expression system 106 determines an intervention opportunity is not present ("no" branch, decision block 204), then emotion representation and expression system 106 returns to step 202 and continues to monitor the user conversation.

If emotion representation and expression system 106 determines an intervention opportunity is present ("yes" branch, decision block 204), then emotion representation and expression system 106 retrieves a user profile (step 206). In the embodiment where the conversation is between a single user and digital assistant system 118, emotion representation and expression system 106 retrieves the user profile associated with the user, previously generated by dialog management module 114, from database 116. In the embodiment where the conversation is between two or more users, based on the detected emotional characteristics of the two or more users, emotion representation and expression system 106 retrieves the user profile associated with each of the two or more users, or at least one of the two or more users, previously generated by dialog management module 114, from database 116. In either embodiment, the user profile includes emotional characteristics and preferences associated with the users.

Emotion representation and expression system 106 determines the context of the conversation (step 208). In an embodiment, emotion representation and expression system 106 analyzes the conversation, whether the conversation is between a user and digital assistant system 118 or between two or more users, and determines the context of the conversation. The context of the conversation may include, but is not limited to, the user's intent, goals, and/or preferences. In an embodiment, emotion representation and expression system 106 uses one or more NLP techniques to determine the context of the conversation. In an embodiment, emotion representation and expression system 106 uses one or more machine learning algorithms to determine the context of the conversation. In an embodiment, emotion representation and expression system 106 uses sentiment analysis and/or named entity recognition to determine the context of the conversation. In an embodiment, emotion representation and expression system 106 instructs dialog management module 114 to determine the context of the conversation.

Emotion representation and expression system 106 generates emotion-based dialog responses (step 210). In an embodiment, based on the user profile and the determined context of the conversation, emotion representation and expression system 106 generates one or more dialog choices to provide a personalized and empathetic response to the current emotional characteristics of the user. In the embodiment where the conversation is between a single user and digital assistant system 118, emotion representation and expression system 106 generates NLP emotion-based responses with which digital assistant system 118 responds to the user. In the embodiment where the conversation is between two or more users, emotion representation and expression system 106 generates NLP emotion-based responses which digital assistant system 118 can provide to each user in the conversation as a recommendation for a response to another user which can express the user's emotions in a personalized and empathetic manner. In an embodiment, emotion representation and expression system 106 uses one or more natural language generation (NLG) algorithms, such as sequence-to-sequence models or transformer-based models, to generate natural language responses that respond to or express the user's emotions in a personalized and empathetic manner. In an embodiment, emotion representation and expression system 106 uses affect-aware sentiment analysis or emotion-based sentiment analysis to understand the emotional tone of the user's input and generate appropriate responses that reflect the user's emotions. In an embodiment, emotion representation and expression system 106 instructs dialog management module 114 to generate emotion-based dialog responses. In an embodiment, emotion representation and expression system 106 uses emotion-based machine translation or emotion-based cross-lingual text classification to translate the generated responses into different languages while preserving the emotional tone and context.

Emotion representation and expression system 106 determines the most appropriate response (step 212). In an embodiment, emotion representation and expression system 106 selects the most appropriate response of the generated emotion-based dialog responses based on the user's emotional characteristics as well as the context and goals of the conversation. In an embodiment, emotion representation and expression system 106 determines two or more appropriate responses. In an embodiment, dialog management module 114 manages the conversation flow to ensure that the responses of digital assistant system 118 are appropriate to the user's emotions and conversational context as well as clear and concise.

Emotion representation and expression system 106 presents the response to the user (step 214). In an embodiment, emotion representation and expression system 106 provides the appropriate response to the user. In an embodiment, emotion representation and expression system 106 displays the response, via digital assistant system 118, on a screen associated with client computing device 120, via user interface 122. In another embodiment, emotion representation and expression system 106 causes digital assistant system 118 to speak the response, via user interface 122. In the embodiment where the conversation is between two or more users, emotion representation and expression system 106 may present a list of responses to the user, via user interface 122, such that the user can select the response the user feels is most appropriate.

Emotion representation and expression system 106 receives feedback associated with the response from the user (step 216). In an embodiment, emotion representation and expression system 106 receives feedback associated with the provided response via user interface 122. In an example where the conversation is between a single user and digital assistant system 118, if the user was satisfied with the response, the user may speak or type "thank you" via user interface 122, and then emotion representation and expression system 106 receives a positive feedback input from digital assistant system 118. In an example where the conversation is between two or more users, digital assistant system 118 determines whether a user spoke a recommended response, and, if not, then emotion representation and expression system 106 receives a negative feedback input from digital assistant system 118. In an embodiment where emotion representation and expression system 106 presents a list of recommended responses, emotion representation and expression system 106 detects which response the user selects from the list and notes the selection as feedback. In an embodiment, emotion representation and expression system 106 may prompt the user for feedback via user interface 122. For example, emotion representation and expression system 106 may display a screen with multiple interactive buttons for the user to answer a question such as "Were you satisfied with the recommended response?" When the user selects the "yes" button, then emotion representation and expression system 106 receives the feedback.

Emotion representation and expression system 106 stores the feedback (step 218). In an embodiment, emotion representation and expression system 106 stores the feedback in database 116. In an embodiment, dialog management module 114 integrates a feedback loop into emotion representation and expression system 106, using the feedback and behavior of the user to train machine learning algorithms, to continuously improve the understanding of the user's emotions and preferences.

In an example use case for emotion representation and expression system 106, a user finds herself frustrated and emotional at the end of a tough workday, and she wants to discuss her situation with her spouse. Unfortunately, her spouse had a tough day too, and is not interested in talking about the user's frustration. As emotion representation and expression system 106 monitors the conversation between the user and her spouse, emotion representation and expression system 106 determines there is an opportunity to intervene in the conversation. Emotion representation and expression system 106 retrieves the user profile associated with the user and determines the context of the conversation, as discussed with respect to steps 206 and 208. Emotion representation and expression system 106 generates emotion-based responses and determines the most appropriate response, as discussed with respect to steps 210 and 212. Emotion representation and expression system 106 then provides the user with a recommended response, as discussed with respect to step 214, such as "I'm feeling really overwhelmed today. Can we talk about it?" or "I'm so frustrated with work right now. Can you listen to me for a minute?" These expressions may be more effective at communicating the user's emotions and avoid misunderstandings or conflicts.

In another example use case for emotion representation and expression system 106, in a team meeting, two colleagues are discussing a new project proposal. The discussion becomes heated, with both parties becoming increasingly emotional and entrenched in their positions. As emotion representation and expression system 106 monitors the conversation between the colleagues, emotion representation and expression system 106 determines there is an opportunity to intervene in the conversation. In this scenario, the colleagues can use emotion representation and expression system 106 to help them communicate more effectively with the other user and resolve their differences. Emotion representation and expression system 106 analyzes the emotions and intentions of the two colleagues and provides personalized recommendations for how they can better express their feelings and needs. For example, emotion representation and expression system 106 may suggest that the first colleague say "I understand your perspective, but I have concerns about the risk involved. Can we discuss some alternatives?" In another example, emotion representation and expression system 106 may suggest that the second colleague say "I appreciate your enthusiasm, but I think we need to consider the potential challenges and risks. Can we find a middle ground?" These expressions are more effective at resolving the conflict and finding a mutually beneficial solution.

In yet another example use case for emotion representation and expression system 106, customer service representatives in many industries can find dealing with customer complaints and issues to be emotionally challenging and stressful, which may lead to decreased job satisfaction. As emotion representation and expression system 106 monitors the conversation between a customer service representative and a customer, emotion representation and expression system 106 can provide a personalized recommendation for how the customer service representative can better understand and respond to the customer's needs while also taking care of their own emotional well-being. For example, emotion representation and expression system 106 can recommend a response such as "I understand you frustration, and I'm here to help. Can we find a solution together?" or "I appreciate your feedback, and I'll make sure to pass it along to our team. Is there anything else I can do for you today?" These expressions can be more effective at resolving customer issues and improving overall customer satisfaction.

FIG. 3 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing environment 300 contains an example of an environment for the execution of at least some of the computer code involved in performing the inventive methods, such as emotion representation and expression system 106 for coordinated emotion representation and expression in multi-agent digital assistants. In addition to emotion representation and expression system 106, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and emotion representation and expression system 106, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/ or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in emotion representation and expression system 106 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid-state storage devices. Operating system 322 may take several forms, such as various known proprietary operating systems or open-source Portable Operating System Interface type operating systems that employ a kernel. The code included in emotion representation and expression system 106 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   monitoring, by one or more computer processors, a conversation of a first user;
   aggregating a dataset of human-agent interactions associated with the first user, wherein the dataset comprises text, audio, and video recordings associated with the first user and the human-agent interactions, where emotions of the first user are explicitly expressed or inferred;
   determining, by one or more computer processors, an intervention opportunity is present in the conversation based on the interactions associated with the first user;
   responsive to determining the intervention opportunity is present, retrieving, by one or more computer processors, a profile associated with the first user;
   determining, by one or more computer processors, a context of the conversation based on the aggregation of the dataset of the human-agent interactions using sentiment analysis and named entity recognition; and
   based on the profile associated with the first user and the context of the conversation, generating, by one or more computer processors, one or more emotion-based responses by utilizing affect-aware sentiment analysis to identify an emotional tone of the first user so the response reflects the emotions of the first user.

2. The computer-implemented method of claim 1, further comprising:
   receiving, by one or more computer processors, feedback from the first user associated with the presented response; and storing, by one or more computer processors, the feedback.

3. The computer-implemented method of claim 1, wherein the conversation is one of a conversation between the first user and a digital assistant system and a conversation between the first user and at least one other user.

4. The computer-implemented method of claim 3, further comprising:
   prior to monitoring the conversation, aggregating, by one or more computer processors, a dataset of interactions between the first user and the digital assistant system;
   classifying, by one or more computer processors, one or more emotion patterns from the dataset;
   representing, by one or more computer processors, the classified one or more emotion patterns in a structured format; and
   based on the represented one or more emotion patterns, generating, by one or more computer processors, the profile associated with the first user.

5. The computer-implemented method of claim 4, further comprising:
   training, by one or more computer processors, a machine learning model with a first subset of the dataset; and
   validating, by one or more computer processors, the machine learning model, with a second subset of the dataset.

6. The computer-implemented method of claim 4, wherein classifying the one or more emotion patterns from the dataset further comprises:
   extracting, by one or more computer processors, a plurality of relevant features from the dataset; and
   identifying, by one or more computer processors, one or more emotion patterns in the extracted features.

7. The computer-implemented method of claim 4, wherein the structure format includes at least one of a vector and a matrix.

8. A computer program product comprising:
   one or more computer readable storage media;
   program instructions, stored on at least one of the one or more computer readable storage media, to monitor a conversation of a first user;
   program instructions, stored on at least one of the one or more computer readable storage media, to aggregate a dataset of human-agent interactions associated with the first user, wherein the dataset comprises text, audio, and video recordings associated with the first user and the human-agent interactions, where emotions of the first user are explicitly expressed or inferred;
   program instructions, stored on at least one of the one or more computer readable storage media, to determine an intervention opportunity is present in the conversation based on the interactions associated with the first user;
   responsive to determining the intervention opportunity is present, program instructions, stored on at least one of the one or more computer readable storage media, to retrieve a profile associated with the first user;
   program instructions, stored on at least one of the one or more computer readable storage media, to determine a context of the conversation based on the aggregation of the dataset of the human-agent interactions using sentiment analysis and named entity recognition; and
   based on the profile associated with the first user and the context of the conversation, program instructions, stored on at least one of the one or more computer readable storage media, to generate one or more emotion-based responses by utilizing affect-aware sentiment analysis to identify an emotional tone of the first user so the response reflects the emotions of the first user.

9. The computer program product of claim 8, further comprising:

program instructions, stored on at least one of the one or more computer readable storage media, to receive feedback from the first user associated with the presented response; and program instructions, stored on at least one of the one or more computer readable storage media, to store the feedback.

10. The computer program product of claim 8, wherein the conversation is one of a conversation between the first user and a digital assistant system and a conversation between the first user and at least one other user.

11. The computer program product of claim 10, further comprising:

prior to monitoring the conversation, program instructions, stored on at least one of the one or more computer readable storage media, to aggregate a dataset of interactions of the first user between the first user and the digital assistant system;

program instructions, stored on at least one of the one or more computer readable storage media, to classify one or more emotion patterns from the dataset;

program instructions, stored on at least one of the one or more computer readable storage media, to represent the classified one or more emotion patterns in a structured format; and based on the represented one or more emotion patterns, program instructions, stored on at least one of the one or more computer readable storage media, to generate the profile associated with the first user.

12. The computer program product of claim 11, further comprising:

program instructions, stored on at least one of the one or more computer readable storage media, to train a machine learning model with a first subset of the dataset; and program instructions, stored on at least one of the one or more computer readable storage media, to validate the machine learning model, with a second subset of the dataset.

13. The computer program product of claim 11, wherein the program instructions to classify the one or more emotion patterns from the dataset comprise:

program instructions, stored on at least one of the one or more computer readable storage media, to extract a plurality of relevant features from the dataset; and program instructions, stored on at least one of the one or more computer readable storage media, to identify one or more emotion patterns in the extracted features.

14. The computer program product of claim 11, wherein the structure format includes at least one of a vector and a matrix.

15. A computer system comprising:

one or more computer processors;

one or more computer readable memories; and one or more computer readable storage media;

program instructions, stored on at least one of the one or more computer readable storage media for execution by at least one of the one or more computer processors via at least one of the one or more memories, to monitor a conversation of a first user;

program instructions, stored on at least one of the one or more computer readable storage media for execution by at least one of the one or more computer processors via at least one of the one or more memories, to aggregate a dataset of human-agent interactions associated with the first user, wherein the dataset comprises text, audio, and video recordings associated with the first user and the human-agent interactions, where emotions of the first user are explicitly expressed or inferred;

program instructions, stored on at least one of the one or more computer readable storage media for execution by at least one of the one or more computer processors via at least one of the one or more memories, to determine an intervention opportunity is present in the conversation based on the interactions associated with the first user;

responsive to determining the intervention opportunity is present, program instructions, stored on at least one of the one or more computer readable storage media for execution by at least one of the one or more computer processors via at least one of the one or more memories, to retrieve a profile associated with the first user;

program instructions, stored on at least one of the one or more computer readable storage media for execution by at least one of the one or more computer processors via at least one of the one or more memories, to determine a context of the conversation based on the aggregation of the dataset of the human-agent interactions using sentiment analysis and named entity recognition; and based on the profile associated with the first user and the context of the conversation, program instructions, stored on at least one of the one or more computer readable storage media for execution by at least one of the one or more computer processors via at least one of the one or more memories, to generate one or more emotion-based responses by utilizing affect-aware sentiment analysis to identify an emotional tone of the first user so the response reflects the emotions of the first user.

16. The computer system of claim 15, further comprising:

program instructions, stored on at least one of the one or more computer readable storage media for execution by at least one of the one or more computer processors via at least one of the one or more memories, to receive feedback from the first user associated with the presented response; and program instructions, stored on at least one of the one or more computer readable storage media for execution by at least one of the one or more computer processors via at least one of the one or more memories, to store the feedback.

17. The computer system of claim 15, further comprising:

prior to monitoring the conversation, program instructions, stored on at least one of the one or more computer readable storage media for execution by at least one of the one or more computer processors via at least one of the one or more memories, to aggregate a dataset of interactions between the first user and a digital assistant system;

program instructions, stored on at least one of the one or more computer readable storage media for execution by at least one of the one or more computer processors via at least one of the one or more memories, to classify one or more emotion patterns from the dataset;

program instructions, stored on at least one of the one or more computer readable storage media for execution by at least one of the one or more computer processors via at least one of the one or more memories, to represent the classified one or more emotion patterns in a structured format; and based on the represented one or more emotion patterns, program instructions, stored on at least one of the one or more computer readable storage media for execution by at least one of the one or more computer processors via at least one of the one or more memories, to generate the profile associated with the first user.

18. The computer system of claim 17, further comprising:

program instructions, stored on at least one of the one or more computer readable storage media for execution by at least one of the one or more computer processors via at least one of the one or more memories, to train a machine learning model with a first subset of the dataset; and program instructions, stored on at least one of the one or more computer readable storage media for execution by at least one of the one or more computer processors via at least one of the one or more memories, to validate the machine learning model, with a second subset of the dataset.

19. The computer system of claim 17, wherein the program instructions to classify the one or more emotion patterns from the dataset comprise:

program instructions, stored on at least one of the one or more computer readable storage media for execution by at least one of the one or more computer processors via at least one of the one or more memories, to extract a plurality of relevant features from the dataset; and program instructions, stored on at least one of the one or more computer readable storage media for execution by at least one of the one or more computer processors via at least one of the one or more memories, to identify one or more emotion patterns in the extracted features.

20. The computer system of claim 17, wherein the structure format includes at least one of a vector and a matrix.

* * * * *